No. 718,109. PATENTED JAN. 13, 1903.
J. R. EASTERLING.
PLANT PROTECTOR.
APPLICATION FILED JAN. 25, 1902.
NO MODEL.
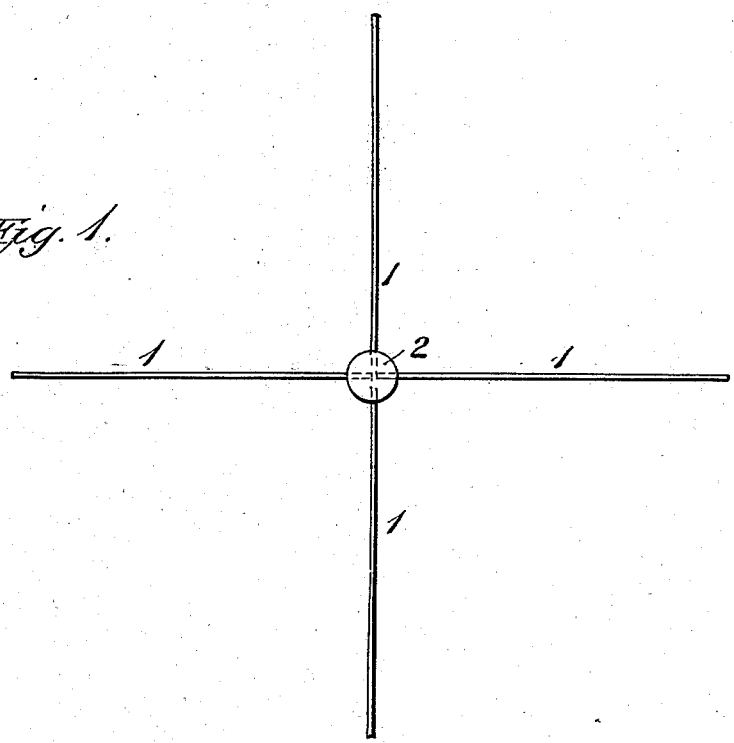
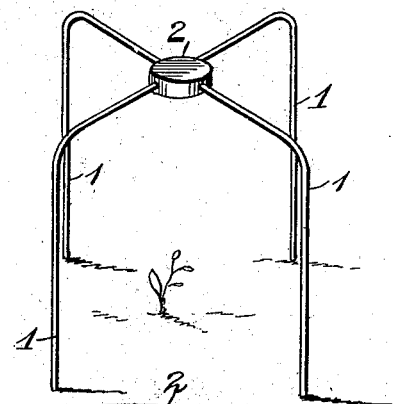
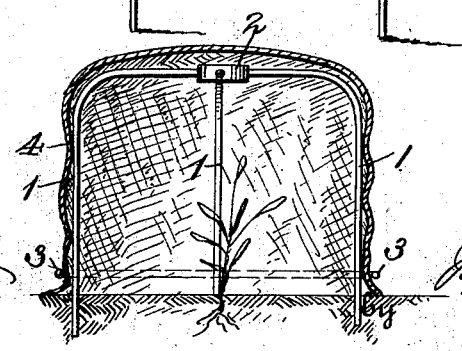

UNITED STATES PATENT OFFICE.

JAMES R. EASTERLING, OF BARNWELL, SOUTH CAROLINA.

PLANT-PROTECTOR.

SPECIFICATION forming part of Letters Patent No. 718,109, dated January 13, 1903.

Application filed January 25, 1902. Serial No. 91,243. (No model.)

*To all whom it may concern:*

Be it known that I, JAMES R. EASTERLING, a citizen of the United States, residing at Barnwell, in the county of Barnwell and State of South Carolina, have invented new and useful Improvements in Plant-Protectors, of which the following is a specification.

My invention relates to plant-protectors for protecting plants or vegetables, and particularly early vegetables, against frost and the like, the object being to so construct the same that it will be cheap, efficient, easily transported, and may be set up with the minimum of trouble and labor.

In the drawings forming a part of this specification, and in which like symbols of reference represent corresponding parts in the several views, Figure 1 is a view of the frame of the device. Fig. 2 is a similar view of the frame bent and set upon the ground, and Fig. 3 is a view of the complete device.

The frame of my device is composed of a series of wires or the like 1 of springy metal joined at 2 by a disk having perforations, or it may be soldered, so that the arms 1 radiate from the same.

3 is a band of rubber or elastic material to hold the sack 4 in proper position when in use, the said bag or sack being adapted to inclose the arms or wires 1 and be held by the same from the plant or vegetable to be protected.

Of course I may use any number of wires or arms as desired, as also any material for the bag or covering. I shall ordinarily use canvas or the like; but I shall be guided in the covering by the nature of the plant or vegetable to be protected.

In packing and transporting my device the same is laid flat, as in Fig. 1, with the wires extended, and it is operated as follows: I first bend the wires to the position shown in Fig. 2. The ends of the wires are then struck into the ground, the covering is placed over the same, and the band of elastic placed over the bag down at the ends of the wires near the ground.

Having now fully described my invention, what I claim as new, and desire to secure by Letters Patent, is—

1. A plant-protector, composed of arms capable of being bent, said arms supported by and passing through a common center piece, and adapted to be driven into the ground.

2. In a plant-protector, a frame composed of arms capable of being bent, said arms passing through and supported by a common center piece, a covering for the frame, and means for holding the covering on the frame.

In testimony whereof I affix my signature in presence of two witnesses.

JAMES R. EASTERLING.

Witnesses:
J. A. SAUL,
JOHN A. SWEENEY.